United States Patent
Sundaram et al.

(10) Patent No.: US 9,409,552 B2
(45) Date of Patent: Aug. 9, 2016

(54) ELECTRONIC PARK BRAKE MODULE AND SYSTEM AND METHOD FOR USE

(75) Inventors: Padma Sundaram, West Bloomfield, MI (US); Mahesh Balike, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 337 days.

(21) Appl. No.: 13/598,237

(22) Filed: Aug. 29, 2012

(65) Prior Publication Data

US 2014/0067221 A1    Mar. 6, 2014

(51) Int. Cl.
| | |
|---|---|
| B60T 8/174 | (2006.01) |
| B60T 8/17 | (2006.01) |
| B60T 7/04 | (2006.01) |
| B60T 7/08 | (2006.01) |
| B60T 7/10 | (2006.01) |
| B60L 7/26 | (2006.01) |
| B60L 15/20 | (2006.01) |

(52) U.S. Cl.
CPC . *B60T 7/042* (2013.01); *B60L 7/26* (2013.01); *B60L 15/2009* (2013.01); *B60T 7/085* (2013.01); *B60T 7/107* (2013.01); *B60L 2240/12* (2013.01); *B60L 2240/30* (2013.01); *B60L 2250/26* (2013.01); *Y02T 10/645* (2013.01); *Y02T 10/72* (2013.01); *Y02T 10/7275* (2013.01)

(58) Field of Classification Search
CPC ......... B60T 7/12; B60T 17/228; B60T 7/085; B60T 7/042; B60T 7/107; B60L 15/2009; B60L 7/26; Y02T 10/72
USPC ............................................................ 701/70
See application file for complete search history.

(56) References Cited

U.S. PATENT DOCUMENTS

| | | | |
|---|---|---|---|
| 2010/0280724 A1* | 11/2010 | Monsere et al. ................ | 701/70 |
| 2011/0082631 A1* | 4/2011 | Busack et al. .................. | 701/70 |

FOREIGN PATENT DOCUMENTS

| | | |
|---|---|---|
| CN | 101823481 A | 9/2010 |
| CN | 101879893 A | 11/2010 |
| CN | 201677866 U | 12/2010 |

OTHER PUBLICATIONS

State Intellectual Property Office of the People's Republic of China, Office Action for Chinese Patent Application No. 201310383537.6 mailed Jun. 1, 2015.

* cited by examiner

*Primary Examiner* — Redhwan k Mawari
*Assistant Examiner* — Rodney P King
(74) *Attorney, Agent, or Firm* — Ingrassia Fisher & Lorenz, P.C.

(57) ABSTRACT

An electronic park brake module for use with a vehicle is disclosed herein. In an embodiment, the electronic park brake module includes, but is not limited to, a processor and an electronic memory unit. The processor and the electronic memory unit are configured to cooperate to determine when a user has made a request for dynamic electronic park braking, to determine whether the user has a first intent or a second intent when requesting dynamic electronic park braking, to send a first command causing a first amount of braking force to be applied when the first intent has been determined, and to send a second command causing a second amount of braking force to be applied when the second intent has been determined.

20 Claims, 3 Drawing Sheets

ELECTRONIC PARK BRAKE MODULE AND SYSTEM AND METHOD FOR USE

TECHNICAL FIELD

The technical field generally relates to vehicles, and more particularly relates to an electronic park brake module for decelerating a vehicle.

BACKGROUND

Park brakes (also known as "emergency brakes") have historically been manually actuated mechanical devices that were configured to pull a cable causing a mechanism to tighten the calipers of the rear brakes of a vehicle. The park brakes have traditionally been used to ensure that a vehicle does not roll out of position, for example, while parked on an incline.

While many vehicles still come equipped with this mechanical device, in recent years, an electronic park brake system has been introduced into the market. The electronic park brake system includes an electronic park brake module (EPBM) and a switch coupled to the EPBM. The switch is mounted in the passenger compartment of the vehicle in a position accessible to the driver or other user. The EPBM is configured to receive an electronic signal when the switch is actuated and in response, the EPBM sends a command to a motor that pulls on a cable which tightens the calipers of the vehicle's rear brakes. In some embodiments, the motor may be mounted directly to the caliper and instead of pulling on a cable, the motor directly tightens the calipers of the rear brakes. When the switch is deactivated, the EPBM sends another signal to the motor to loosen the calipers of the vehicle's rear brakes.

Conventional electronic park brake systems may be configured to function in at least two modes; static mode and dynamic mode. Static mode encompasses the traditional usage described above where the vehicle is parked and the driver/user wants to ensure that the vehicle does not roll away. Dynamic mode encompasses actuation of the vehicle's electronic park brake while the vehicle is in motion. For example, as the vehicle is decelerating to stop for a traffic light or for a stop sign, the driver may wish to engage the electronic park brake instead of using the vehicle's service brake.

When operated in static mode, the EPBM will send a command that causes the motor to exert a higher level of braking force than is applied when the EPBM is operated in dynamic mode. For example, when actuated in static mode, the EPBM may cause the vehicle's park brakes to exert enough braking force to hold the vehicle stationary on a 20% grade.

While the electronic park brake system described above is adequate, there is room for improvement. Conventional electronic park brake systems are easily actuated. For example, a conventional electronic park brake system may be actuated through the pressing of a button mounted to the instrument panel. Such actuation may require very little force and, consequently, it may be possible for the driver or another occupant of the vehicle to unintentionally actuate the system. If this were to happen while the vehicle were traveling at speed, a conventional electronic park brake system would operate in dynamic mode and would exert the predetermined amount of braking force. The sudden onset of the predetermined amount of braking force may be undesirable to the driver when it is not expected.

Accordingly, it is desirable to provide an electronic park brake module that addresses this issue. It is also desirable to provide a system for decelerating a vehicle that addresses this issue. Further, it is desirable to provide a method for decelerating a vehicle that addresses this issue. Furthermore, other desirable features and characteristics of the present invention will become apparent from the subsequent detailed description and the appended claims, taken in conjunction with the accompanying drawings and the foregoing technical field and background.

SUMMARY

Various embodiments of an electronic park brake module, a system for decelerating a vehicle, and a method for decelerating a vehicle are disclosed herein.

In a first non-limiting embodiment, the electronic park brake module includes, but is not limited to a processor and an electronic memory unit. The processor and the electronic memory unit are configured to cooperate to determine when a user has made a request for dynamic electronic park braking, to determine whether the user has a first intent or a second intent when requesting dynamic electronic park braking, to send a first command causing a first amount of braking force to be applied when the first intent has been determined, and to send a second command causing a second amount of braking force to be applied when the second intent has been determined.

In another non-limiting embodiment, the system for decelerating the vehicle includes, but is not limited to, a service brake sub-system that includes an Electronic Brake Control Module (EBCM) and a brake pedal that is communicatively coupled with the EBCM. The system for decelerating the vehicle further includes, but is not limited to, an electronic park brake sub-system that includes an Electronic Park Brake Module (EPBM) and an electronic park brake actuator that is communicatively coupled with the EPBM. The EPBM includes a processor and an electronic memory unit. The service brake sub-system and the park brake sub-system are each operatively coupled to a vehicle brake. The EBCM and the EPBM are each communicatively coupled with one another. The processor and the electronic memory unit are configured to cooperate to determine when a user has made a request for dynamic electronic park braking based on an actuation state of the electronic park brake actuator, to determine whether the user has a first intent or a second intent when requesting dynamic electronic park braking based on a position of the brake pedal, to send a first command causing a first amount of braking force to be applied to the vehicle brake when the first intent has been determined, and to send a second command causing a second amount of braking force to be applied to the vehicle brake when the second intent has been determined.

In yet another non-limiting embodiment, the method for decelerating a vehicle includes, but is not limited to, determining when a user has made a request for dynamic electronic park braking. The method further comprises ascertaining a state of a brake pedal of the vehicle. The method further comprises determining with a processor whether the user has a first intent or a second intent based on the state of the brake pedal. The method further comprises sending, with the processor, a first command causing a first amount of braking force to be applied by a vehicle brake when the first intent has been determined. The method still further comprises sending a second command causing a second amount of braking force to be applied by the vehicle brake when the second intent has been determined.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

An electronic park brake module, a system for decelerating a vehicle, and a method for decelerating a vehicle are disclosed herein. In an embodiment, the module, system, and method determine a driver's intent when the electronic park brake is actuated while the vehicle is in motion. The module, system, and method then provide an amount of braking force that corresponds with the driver's intent. In an embodiment, the driver's intent can be determined based on the state of the vehicle's brake pedal. In an embodiment, if the brake pedal is depressed when the electronic park brake is actuated, then the module, system, and method determine that the driver is attempting to decelerate the vehicle and that a relatively high amount of braking assistance is sought from the electronic park brake. In that case, a relatively high amount of braking assistance from the electronic park brake will be provided. If, however, the brake pedal is not depressed when the electronic park brake is actuated, then the module, system, and method determine that the driver is not intentionally attempting to decelerate the vehicle or, alternatively, that the driver is not seeking a substantial amount of braking assistance from the electronic park brake. In that case, a relatively low amount of braking assistance from the electronic park brake will be provided.

A further understanding of the above described module, system and method may be obtained through a review of the illustrations accompanying this application together with a review of the detailed description that follows.

Figure 1:
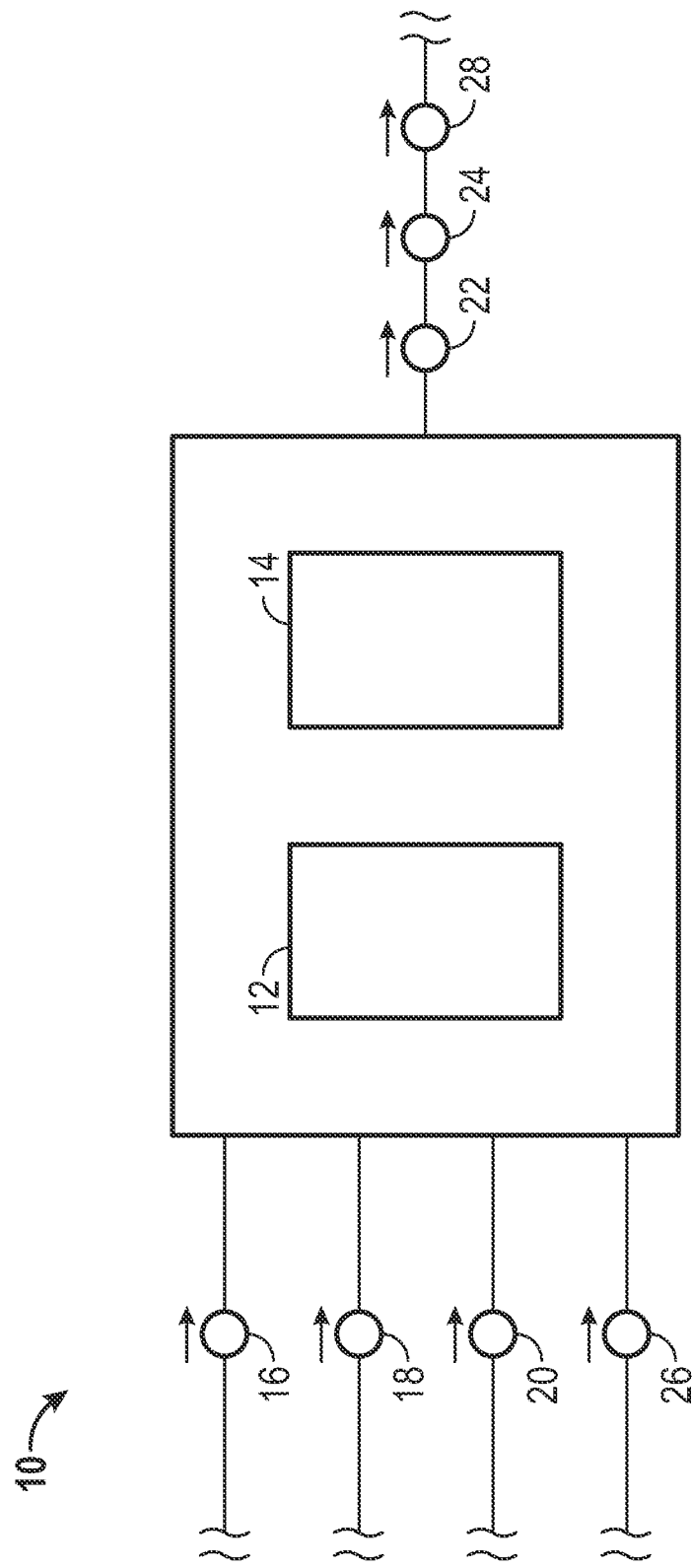
FIG. 1 is a schematic view illustrating an electronic park brake module configured in accordance with an embodiment.

FIG. 1 illustrates a non-limiting embodiment of an electronic park brake module (EPBM 10) made in accordance with the teachings disclosed herein. As used herein, the term "module" refers to any hardware, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of EPBM 10 are not limited to usage with automobiles, but rather may be compatible for use with any type of motorized vehicle configured to travel over land. Although EPBM 10 is illustrated in FIG. 1 as comprising a single component, it should be understood that in other embodiments, EPBM 10 may be combined with other components to comprise a module capable of performing multiple functions. For example, in other embodiments, EPBM 10 and/or its functionality may be combined with/integrated into an electronic brake control module that is configured to actuate the vehicle's service brakes.

EPBM 10 includes a processor 12 and an electronic memory unit 14. Processor 12 may be any type of computer, computer system, or microprocessor that is configured to perform algorithms, to execute software applications, to execute sub-routines and/or to be loaded with, and to execute, any other type of computer program. Processor 12 may comprise a single processor or a plurality of processors acting in concert. In some embodiments, processor 12 may be dedicated for use exclusively with a vehicle's electronic park brake system while in other embodiments, processor 12 may be shared with other systems on board a vehicle.

Electronic memory unit 14 may comprise any device that is configured to store data and/or instructions. Electronic memory unit 14 may be any type of data storage component including, without limitation, non-volatile memory, volatile memory, disk drives, tape drives, and mass storage devices and may include any suitable software, algorithms and/or sub-routines that provide electronic memory unit 14 with the capability to store, organize, and permit the retrieval of data.

Processor 12 may be communicatively and/or operatively coupled with electronic memory unit 14 and both components are configured to cooperate to enable EPBM 10 to perform the tasks described herein below. In some embodiments, processor 12 and electronic memory unit 14 are also configured to cooperate to enable EPBM 10 to perform the conventional electronic park brake module tasks described in the background section above. As discussed below, any reference to EPBM 10 as being "configured to" perform a task should be understood to mean that processor 12 and electronic memory unit 14 are configured to cooperate to cause EPBM 10 to perform that task, unless specifically noted otherwise.

EPBM 10 is configured to receive a signal 16 from an electronic park brake actuator. Signal 16 includes information indicative of actuation of a vehicle's electronic park brake system by a user. Signal 16 may be sent directly by an actuation device associated with a vehicle's electronic park brake system or by a sensor configured to monitor an actuation device, or by any other component configured to detect and/or determine when a user has requested actuation of a vehicle's electronic park brake system.

EPBM 10 is further configured to receive a signal 18. Signal 18 includes information indicative of the position of a vehicle's brake pedal. In some embodiments, signal 18 may be sent directly by the vehicle's brake pedal. In other embodiments, signal 18 may be sent by a sensor configured to monitor the position of the vehicle's brake pedal. In other embodiments, signal 18 may be sent by a vehicle's electronic brake control module. In still other embodiments, signal 18 may be sent by any other component on a vehicle that is configured to detect/determine the position of a vehicle's brake pedal.

EPBM 10 is further configured to receive signal 20. Signal 20 includes information indicative of whether the vehicle is currently in motion. Signal 20 may also include information indicative of the speed at which the vehicle is currently moving. In some embodiments, signal 20 may be sent by the vehicle's speedometer. In other embodiments, signal 20 may be sent by the vehicle's GPS navigation system. In other embodiments, signal 20 may be sent by the vehicle's telematics unit. In still other embodiments, signal 20 may be sent by any other component configured to detect whether the vehicle is in motion and/or at what speed the vehicle is moving.

In response to receiving signal 16, EPBM 10 is configured to determine whether a driver/user has made a request for either dynamic electronic park braking or for static electronic park braking EPBM 10 utilizes signal 20 to make this determination. In instances where signal 20 indicates that the vehicle is stationary, EPBM 10 is configured to determine that the driver/user is requesting static electronic park braking. In instances where signal 20 indicates that the vehicle is in motion, EPBM 10 is configured to determine that the driver/user is requesting dynamic electronic park braking. As used herein, the term "dynamic electronic park braking" refers to application of the vehicle's electronic park brake system while the vehicle is in motion. In some embodiments, "dynamic electronic park braking" may refer to application of the vehicle's electronic park brake system while the vehicle is in motion and moving above a predetermined rate of speed. The discussion below relates primarily to circumstances where the driver/user makes a request for dynamic electronic park braking.

In instances where signal 20 includes information indicating that the vehicle is in motion and/or is moving above a predetermined rate of speed and where signal 16 includes information indicative of a user request for electronic park braking, EPBM 10 is configured to determine that the driver/user has made a request for dynamic electronic park braking. In such circumstances, when signal 18 includes information indicative of the brake pedal being in an actuated state (i.e., the user is currently applying the vehicle's service brakes), EPBM 10 is configured to determine that the user has a first intent (e.g., that the user is attempting to slow the vehicle and is seeking a relatively high amount of braking assistance from the vehicle's electronic park brake system). In this circumstance, EPBM 10 is configured to send a command 22 containing an instruction to exert a relatively high level of braking force via the vehicle's park brakes. In some embodiments, command 22 may contain an instruction to exert up to 0.6 g of deceleration. In some embodiments, EPBM 10 may be configured to send command 22 to an actuator that is configured to actuate the vehicle's park brakes while in other embodiments, EPBM 10 may be configured to send command 22 to the vehicle's electronic brake control module which, in turn, will actuate the vehicle's park brakes. In still other embodiments, EPBM 10 may be configured to send command 22 to any other component on the vehicle configured to cause the vehicle's park brakes to engage.

In instances where EPBM 10 has determined that the driver/user has made a request for dynamic electronic park braking, but where signal 18 includes information indicative of the brake pedal being in a non-actuated state (i.e., the user is not currently applying the vehicle's service brakes), EPBM 10 is configured to determine that the user has a second intent (e.g., either that the user is attempting to slow the vehicle and is seeking a relatively low amount of braking assistance from the vehicle's electronic park brake system or that the user is not attempting to slow the vehicle and may have unintentionally made a request for dynamic electronic park braking). In this circumstance, EPBM 10 is configured to send a command 24 containing an instruction to exert a relatively low level of braking force via the vehicle's park brakes. In some embodiments, command 24 may contain an instruction to exert up to 0.3 g of deceleration. As before, EPBM 10 may be configured to send command 24 to an actuator configured to actuate the vehicle's park brakes while in other embodiments, EPBM 10 may be configured to send a command 24 to the vehicle's electronic brake control module while in still other embodiments, EPBM 10 may be configured to send command 24 to any other component on the vehicle configured to cause the vehicle's park brakes to engage.

In some embodiments, when signal 20 includes information indicating that the vehicle is moving below the predetermined rate of speed, EPBM 10 may be configured to determine that the driver/user has requested static electronic park braking and that dynamic electronic park braking is not sought or appropriate. In such circumstances, EPBM 10 may be configured to cause the vehicle's electronic park brakes to exert the predetermined amount of braking force associated with static electronic park braking.

In some embodiments, EPBM 10 may be further configured to receive a signal 26. Signal 26 contains information indicative of whether the vehicle's brakes are available to perform dynamic electronic park braking. For example, in instances where the EBCM has an internal failure it will turn on a message indicating that service brakes will not be able to honor EPBM request for dynamic apply. When EPBM 10 receives signal 26 containing information indicating that the EBCM is unavailable to perform dynamic brake apply, or when EPBM detects certain types of communication failures with EBCM, EPBM 10 is configured to determine that primary dynamic electronic park braking is not available. Under these circumstances, EPBM 10 may be configured to refrain from transmitting command 22 and/or command 24. Alternatively, EPBM 10 may be configured to transmit a command 28 that is configured to cause a pseudo-anti-lock braking protocol to be implemented by the vehicle's park brakes to bring the vehicle to a stop.

Figure 2:
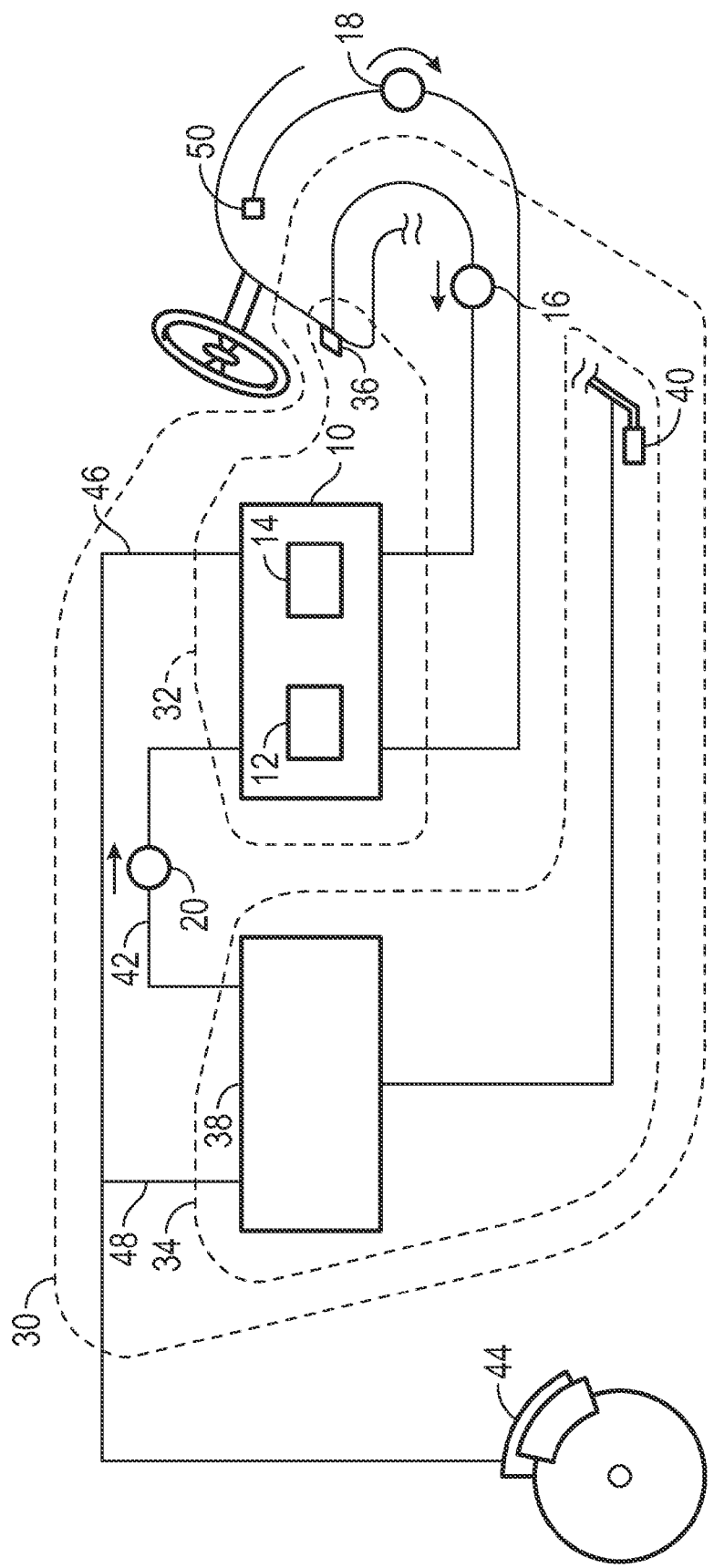
FIG. 2 is a schematic view illustrating a system for decelerating a vehicle configured in accordance with an embodiment.

FIG. 2 illustrates a non-limited embodiment of a system 30 that is configured to decelerate a vehicle. System 30 includes an electronic park brake sub-system 32 and a service break sub-system 34. Electronic park brake sub-system 32 includes EPBM 10 and an actuator 36 communicatively coupled with EPBM 10. A driver/user may request dynamic electronic park braking by actuating actuator 36 which, in turn, sends signal 16 containing information indicative of the request to EPBM 10.

Service break sub-system 34 includes an electronic brake control module 38 and a brake pedal 40 communicatively coupled with electronic brake control module 38. In some embodiments, brake pedal 40 may be configured to determine its position and to communicate its position to electronic brake control module 38 while in other embodiments, a separate sensor or other component may be included to detect the position of brake pedal 40 and to communicate the position of brake pedal 40 to electronic brake control module 38. In still other embodiments, any other sensor, controller, or other component that is configured to determine that the vehicle's brakes are being engaged may be employed to transmit such information to EPBM 10. In the illustrated embodiment, electronic brake control module 38 and EPBM 10 are communicatively coupled to one another via lead 42.

EPBM 10 is operatively coupled with a vehicle brake 44 via lead 46. Similarly, electronic brake control module 38 is operatively coupled with vehicle brake 44 via lead 48. In some embodiments, vehicle brake 44 may comprise a rear vehicle brake. In other embodiments, the vehicle brake 44 may comprise multiple rear vehicle brake. In still other embodiments, vehicle brake 44 may comprise a vehicle brake other than a rear vehicle brake. Through their respective operative coupling to vehicle brake 44, in the embodiment illustrated in FIG. 2, both EPBM 10 and electronic brake control module 38 are configured to actuate vehicle brake 44. In other embodiments, electronic brake control module 38 may be configured to actuate the vehicle brake 44 by sending commands to and/or through electronic brake control module 38. In still other embodiments, EPBM 10 and electronic brake control module 38 may be combined into a single brake controlling module.

When a driver/user actuates actuator 36, signal 16 is delivered to EPBM 10. A vehicle speedometer 50 is communicatively coupled with EPBM 10 and is configured to transmit signal 18 to EPBM 10. As discussed above, signal 18 contains information indicative of the vehicle's speed. Based on the information contained in signal 16 and signal 18, EPBM 10 is configured to determine that the driver/user has requested dynamic electronic park braking. Electronic brake control module 38 is configured to transmit signal 20 to EPBM 10. Using the information contained in signal 20, EPBM 10 is configured to determine whether the driver/user has a first intent (seeks relatively high braking force) or a second intent (seeks no or relatively low braking force). Once that determination has been made, EPBM 10 is configured to transmit an appropriate command to vehicle brake 44 to slow the vehicle. When EPBM 10 determines that the driver/user seeks a relatively high braking force, EPBM 10 is configured to send a command to vehicle brakes 44 causing the exertion of a relatively high braking force. Conversely, when EPBM 10 determines that the driver/user seeks relatively low braking force or no braking force, then EPBM 10 sends a command to vehicle brakes 44 causing the exertion of a relatively low braking force. In cases where the driver/user seeks a relatively low braking force, the exertion of a relatively low braking force will be expected. In cases where actuator 36 has been unintentionally actuated and the driver/user is not seeking any braking force, the application of a relatively low braking force will alert the driver to the fact that actuator 36 has been actuated without startling the driver.

Although FIG. 2 depicts the various subsystems and components thereof as being directly communicatively or operatively coupled with one another via leads, wires, and/or other lines of transmission, it should be understood that any configuration suitable for the conveyance of signals and/or commands may also be employed. For example, the various components and subsystems may be wirelessly coupled to one another. In another example, the various components and subsystems may have a wired connection to a vehicle bus across which some or all electronic components of the vehicle transmit messages, signals, and/or commands to one another.

Figure 3:
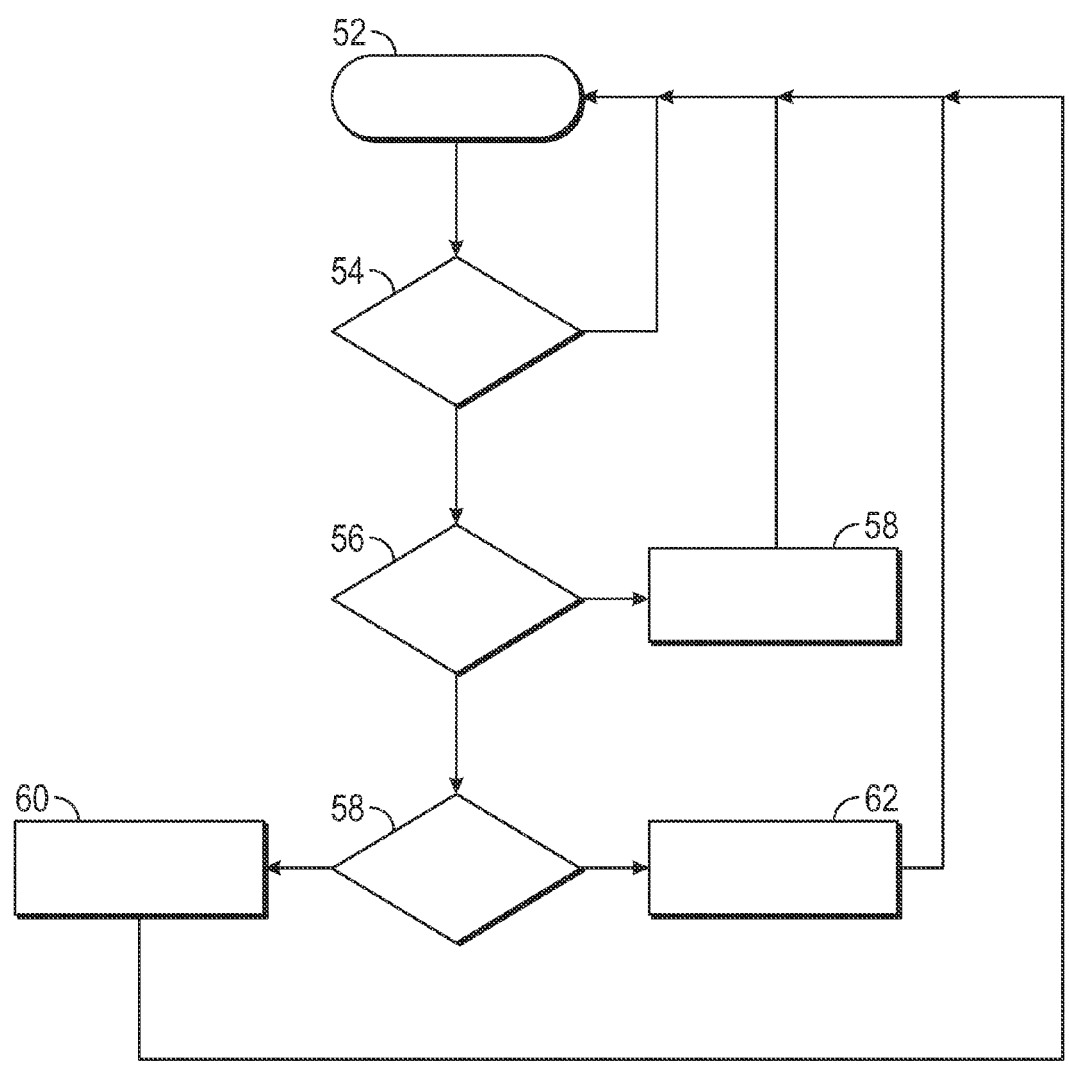
FIG. 3 is a flowchart illustrating an embodiment of a method for decelerating a vehicle in accordance with an embodiment.

FIG. 3 is a flowchart depicting a method for decelerating a vehicle. With continuing reference to FIGS. 1-3, the method begins at box 52 where an electronic park brake system awaits a request from a driver/user for electronic park braking. The method depicted in FIG. 3 may be performed using system 30, described above, which utilizes EPBM 10, also described above. In other embodiments, the method may be performed by any suitable electronic park brake system using any suitable electronic park brake module.

At box 54, the electronic park brake system determines whether a user/driver has made a request for electronic park braking. Such determination may be made based on the system's receipt of a signal from an actuator such as actuator 36. In other embodiments, any suitable method of initiating electronic park braking may be employed. If no request for electronic park braking is received by the electronic park brake system, the method returns to box 52. If the request for electronic park braking is received, the method progresses to box 56.

At box 56, electronic park brake system determines whether dynamic electronic park braking is allowed/available. When making this determination, the electronic park brake system will consider whether the vehicle is moving above a predetermined rate of speed. This determination may be made utilizing information provided by other systems on board the vehicle including, but not limited to, the vehicle's speedometer, the vehicle's GPS system, the vehicle's telematics system, or any other system and/or component on board the vehicle and configured to detect motion and/or determined speed. If the electronic park brake system determines that the vehicle is not in motion or the vehicle is moving below a predetermined threshold speed, electronic park brake system will determine that dynamic electronic park braking is not available/appropriate and may instead initiate static electronic park braking.

At box 56, the electronic park brake system will also consider whether the vehicle's brakes are available to perform dynamic electronic park braking. This decision may be made based on information received from other components on board the vehicle including, but not limited to, the vehicle's electronic brake control module. If, for example, the electronic park brake system determines that the vehicle's brakes are unavailable because they are currently being employed to provide anti-lock braking, then the method progresses to box 58.

At box 58, electronic park brake system will send a command to the vehicle's brakes causing the vehicle's brakes to initiate pseudo-antilock braking. Pseudo-anti-lock braking is form of anti-lock braking that the electronic park brake module is configured to control and which pulses the vehicle's rear brakes.

If, at box 56, electronic park brake system determines that the vehicle's brakes are available for electronic park braking, then the method progresses to box 58.

At box 58, electronic park brake system determines the intent of the driver/user. In some embodiments, intent of the driver/user is determined based on whether the vehicle's service brakes are currently being employed. This determination may be made based on information provided by the brake pedal, or information provided by a sensor associated with the brake pedal that is configured to detect the position of the brake pedal or information provided by the controller of the vehicle and configured to control and/or monitor some or all of the systems on board the vehicle or by any other system and/or component on board the vehicle configured to detect when the vehicle's brakes are being applied.

If electronic park brake system determines that the vehicle's service brakes are being applied, then the method progresses from box 58 to box 60. At box 60, the electronic park brake system sends a command to the vehicle's park brakes that causes the vehicle's park brakes to be applied and to exert a relatively high level of braking force. In some embodiments, the electronic park brake system may be configured to apply up to 0.6 g of deceleration. After this braking force has been applied, the method returns to box 52 to start again.

If electronic park brake system determines that the vehicle's brakes are not being applied, then the method progresses from box 58 to box 62. At box 62, the electronic park brake system sends a command to the vehicle's part brakes cause the vehicle's part brakes to be applied and to exert a relatively low level of braking force. In some embodiments, the electronic park brake system may be configured to apply up to 0.3 g of deceleration. After this braking force has been applied, the method returns to box 52 to start again.

In some embodiments, after the electronic park brake system has sent a command causing the actuation of the vehicle's park brakes (either with a relatively high level or a relatively low level of braking force), the electronic park brake system may be configured to automatically discontinue the exertion of the braking force after a predetermined period of time. In other embodiments, the electronic park brake system may be configured to maintain the exertion of the braking force until a second signal is received containing information indicative of a driver/user's intent to discontinue dynamic electronic park brake.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electronic park brake module for use with a vehicle, the electronic park brake module comprising:
   a processor; and
   an electronic memory unit,
   wherein the processor and the electronic memory unit are configured to cooperate to:
      determine when a user has actuated the electronic park brake module,
      determine whether the user has a first intent, a second intent or a third intent when actuating the electronic park brake module,
      send a first command causing a first predetermined amount of braking force to be applied by a parking brake on the vehicle when the processor and the electronic memory unit have determined that the user has the first intent,
      send a second command causing a second predetermined amount of braking force to be applied by the parking brake on the vehicle when the processor and the electronic memory unit have determined that the user has the second intent, and
      send a third command causing a third predetermined amount of braking force to be applied by the parking brake on the vehicle when the processor and the electronic memory unit have determined that the use has the third intent,
   wherein the first predetermined amount of braking force exceeds the second predetermined amount of braking force, and wherein the second predetermined amount of braking force exceeds the third predetermined amount of braking force.

2. The electronic park brake module of claim 1, wherein the processor and the electronic memory unit are configured to cooperate to determine when the user has actuated the electronic park brake module based on information received from a dynamic electronic park brake switch.

3. The electronic park brake module of claim 1, wherein the processor and the electronic memory unit are configured to cooperate to determine that the user has the second intent based on information received from another component indicative of a position of a service brake pedal of the vehicle.

4. The electronic park brake module of claim 3, wherein the processor and the electronic memory unit are configured to cooperate to determine that the user has the second intent when the information indicates that the service brake pedal is depressed.

5. The electronic park brake module of claim 3, wherein the processor and the electronic memory unit are configured to cooperate to determine that the user has the third intent when the information indicates that the brake pedal is not depressed.

6. The electronic park brake module of claim 1, wherein the processor and the electronic memory unit are configured to cooperate to send the first command and the second command and the third command to an actuator associated with the parking brake of the vehicle.

7. The electronic park brake module of claim 1, wherein the processor and the electronic memory unit are further configured to cooperate to determine whether dynamic electronic park braking is allowed.

8. The electronic park brake module of claim 7, wherein the processor and the electronic memory unit are further configured to cooperate to determine whether dynamic electronic park braking is allowed based on information received from another component indicative of a speed of the vehicle.

9. The electronic park brake module of claim 7, wherein the processor and the electronic memory unit are further configured to cooperate to determine whether dynamic electronic park braking is allowed based on information received from another component indicative of an availability of a brake of the vehicle to provide dynamic electronic park braking.

10. A system for decelerating a vehicle, the system comprising:
   a service brake sub-system including an Electronic Brake Control Module (EBCM) and a brake pedal communicatively coupled with the EBCM; and
   an electronic park brake sub-system including an Electronic Park Brake Module (EPBM) and an electronic park brake actuator communicatively coupled with the EPBM, the EPBM including a processor and an electronic memory unit,
   wherein the service brake sub-system and the electronic park brake sub-system are each operatively coupled to a vehicle brake,
   wherein the EBCM and the EPBM are each communicatively coupled with one another, and
   wherein the processor and the electronic memory unit are configured to cooperate to:
      determine when a user has actuated the EPBM based on an actuation state of the electronic park brake actuator,
      determine whether the user has a first intent a second intent or a third intent when actuating the EPBM,
      determine whether the user has the first intent based on the speed of the vehicle,
      determine whether the user has the second intent or the third intent based on the speed of the vehicle and a position of the brake pedal,
      send a first command causing a first predetermined amount of braking force to be applied to the vehicle brake when the processor and the electronic memory unit have determined that the user has the first intent,
      send a second command causing a second predetermined amount of braking force to be applied to the vehicle brake when the processor and the electronic memory unit have determined that the user has the second intent, and
      send a third command causing a third predetermined amount of braking force to be applied to the vehicle brake when the processor and the electronic memory have determined that the user has the third intent
   wherein the first predetermined amount of braking force exceeds the second predetermined amount of braking force, and wherein the second predetermined amount of braking force exceeds the third predetermined amount of braking force.

11. The system of claim 10, wherein the processor and the electronic memory unit are configured to cooperate to determine that the user has the second intent when the brake pedal is depressed.

12. The system of claim 10, wherein the processor and the electronic memory unit are configured to cooperate to determine that the user has the third intent when the brake pedal is not depressed.

13. The system of claim 10, wherein the processor and the electronic memory unit are further configured to cooperate to determine whether electronic park braking is allowed.

14. The system of claim 13, wherein the processor and the electronic memory unit are further configured to cooperate to determine whether dynamic electronic park braking is allowed based on information received from another component indicative of a speed of the vehicle.

15. The system of claim 13, wherein the processor and the electronic memory unit are further configured to cooperate to determine whether dynamic electronic park braking is allowed based on information received from the EBCM indicative of an availability of the vehicle brake to provide dynamic park braking.

16. The system of claim 10, wherein the second predetermined amount of braking force is equivalent to a deceleration of approximately 0.6 g.

17. The system of claim 10, wherein the third amount of braking force is equivalent to a deceleration of approximately 0.3 g.

18. A method for decelerating a vehicle, the method comprising:
   determining when a user has actuated an electronic park brake module of the vehicle with a processor associated with the electronic park brake module of the vehicle;
   ascertaining a speed of the vehicle and a state of a brake pedal of the vehicle;
   determining with the processor whether the user has a first intent, a second intent or a third intent when the user actuates the electronic park brake module of the vehicle;
   determining that the user has the first intent when the speed of the vehicle falls below a predetermined threshold;
   determining that the user has the second intent when the speed of the vehicle exceeds the predetermined threshold and the brake pedal is depressed;
   determining that the user has the third intent when the speed of the vehicle exceeds the redetermined threshold and the brake pedal is not depressed;
   sending, with the processor, a first command causing a first predetermined amount of braking force to be applied by a vehicle brake when the processor has determined that the user has the first intent;
   sending, with the processor, a second command causing a second predetermined amount of braking force to be applied by the vehicle brake when the processor has determined that the user has the second intent; and
   sending, with the processor, a third command causing a third predetermined amount of braking force to be applied by the vehicle brake when the processor has determined that the user has the third intent
   wherein the first predetermined amount of braking force exceeds the second predetermined amount of braking force, and wherein the second predetermined amount of braking force exceeds the third predetermined amount of braking force.

19. The method of claim 18, further comprising determining, with the processor, whether dynamic electric park braking is available.

20. The method of claim 18, wherein sending the second command comprises sending the second command to the vehicle brake to exert up to 0.6 g of deceleration and wherein sending the third command comprises sending the third command to the vehicle brake to exert up to 0.3 g of deceleration.

* * * * *